(12) United States Patent
Harari

(10) Patent No.: US 9,572,304 B2
(45) Date of Patent: Feb. 21, 2017

(54) SOLAR POWER APPARATUS PROVIDING ILLUMINATION TO HANGING FLOWER PLANTERS OR POTTED FLOWERS

(71) Applicant: Jacob Harari, Brooklyn, NY (US)

(72) Inventor: Jacob Harari, Brooklyn, NY (US)

(*) Notice: Subject to any disclaimer, the term of this patent is extended or adjusted under 35 U.S.C. 154(b) by 68 days.

(21) Appl. No.: 14/077,420

(22) Filed: Nov. 12, 2013

(65) Prior Publication Data

US 2014/0133139 A1    May 15, 2014

Related U.S. Application Data

(60) Provisional application No. 61/725,372, filed on Nov. 12, 2012.

(51) Int. Cl.

| | |
|---|---|
| *F21L 4/00* | (2006.01) |
| *A01G 7/04* | (2006.01) |
| *F21V 33/00* | (2006.01) |
| *F21S 9/03* | (2006.01) |
| *A01G 9/02* | (2006.01) |
| *F21V 9/08* | (2006.01) |
| *F21V 23/04* | (2006.01) |
| *F21W 131/10* | (2006.01) |
| *F21W 131/109* | (2006.01) |
| *F21Y 101/00* | (2016.01) |

(52) U.S. Cl.
CPC .............. *A01G 7/045* (2013.01); *A01G 9/024* (2013.01); *F21S 9/03* (2013.01); *F21V 33/0028* (2013.01); *F21V 9/08* (2013.01); *F21V 23/0464* (2013.01); *F21W 2131/10* (2013.01); *F21W 2131/109* (2013.01); *F21Y 2101/00* (2013.01); *F21Y 2105/10* (2016.08); *F21Y 2115/10* (2016.08)

(58) Field of Classification Search
CPC ............ A01G 7/045; A01G 9/024; F21S 9/03; F21V 33/0028
USPC ................................ 362/122, 157, 183, 806
See application file for complete search history.

(56) References Cited

U.S. PATENT DOCUMENTS

| | | | |
|---|---|---|---|
| 2007/0221133 A1* | 9/2007 | Richmond | ........... A01K 39/012 119/72 |
| 2013/0049609 A1* | 2/2013 | Browder | ........................ 315/159 |
| 2014/0022773 A1* | 1/2014 | Colby | ..................... F21S 9/037 362/183 |

* cited by examiner

*Primary Examiner* — Andrew Coughlin
*Assistant Examiner* — Meghan Ulanday
(74) *Attorney, Agent, or Firm* — Ostrolenk Faber LLP

(57) ABSTRACT

A solar-powered lighting/illumination fixture for hanging flower planters or potted flowers comprises a body that can be affixed through a central opening or the like to the hanging hardware of the planter. The lighting fixture has solar cells that charge internal batteries during daylight hours and drive lights that illuminate the planter during nighttime hours. The fixture can also be affixed with a spoke that will allow it to be supported in the ground to provide pathway lighting. The lighting is provided through LEDs which also may accommodate light filters that can provide different colors to change the mood of the setting, as well as being provided with an adapter to fit most hanging planters in the market and also provided with an attaching mechanism that allows the height of the lighting fixture above the planter to be adjusted.

10 Claims, 3 Drawing Sheets

SOLAR POWER APPARATUS PROVIDING ILLUMINATION TO HANGING FLOWER PLANTERS OR POTTED FLOWERS

CROSS REFERENCE TO RELATED APPLICATION

This application claims the benefit and priority of U.S. Provisional patent application Ser. No. 61/725,372 filed Nov. 12, 2012, entitled SOLAR POWER ILLUMINATION OF OUTDOOR HANGING FLOWER PLANTER OR POTTER FLOWERS, IN AN ECONOMICAL WAY WITH DUAL FUNCTIONALITY OF PATHWAY SOLAR LIGHTING, WITH ADJUSTABLE HEIGH FEATURE, the entire disclosure of which is incorporated herein by reference.

BACKGROUND OF THE INVENTION

The present invention is generally directed to a solar power illumination device and, more particularly, to a solar power an illumination device for outdoor hanging flower planters or potted flowers, which is economical and provides dual functionality of pathway solar lighting with an adjustable height feature.

Illuminating a hanging planter outside the home has been, in the past, a difficult and expensive process, requiring a substantial investment on the part of the homeowner or business owner, often requiring them to invest in an entire new, expensive lighting assembly.

Prior art planters that combine the hanging planter with a lighting system, as described in design patent D253,382, are difficult to transfer from one planter to another. Therefore, prior users were unable to illuminate their planters and potted flowers with lighting features provided with another planter.

Some devices are available in the marketplace which are characterized by having an expensive assembly comprising a basket for the planter, as well as an illuminating device attached to the basket. The cost of such structures is prohibitive and not easily adaptable for hanging planters. Homeowners and business owners would have to spend several times the cost to adapt prior art light systems for hanging planters. Thus, prior art illuminating devices are not adaptable to different hangers and cannot be used as a traditional pathway solar light.

SUMMARY OF THE INVENTION

Accordingly, it is an object of the present invention to provide illumination devices for hanging planters that avoid or ameliorate the drawbacks of the prior art.

In general, is it an objective of the invention to provide a simple design which makes it affordable to manufacture and purchase, as well as easy to install in any existing planters, as well as having the dual functionality of a traditional pathway solar light.

It is another object of the present invention to provide a lighting system for hanging planters that does not require electrical wiring or being tethered to a source of electrical power.

It is another object of the present invention to provide a lighting system for hanging planters that is easily adaptable to different modes of hanging planters and also adjustable at a desired height relative to the hanging planters.

The foregoing and other objects of the invention are realized with the disclosure of preferred embodiments of the invention herein, which allows a user to use his/her presently owned hanging planters and potted flowers and is more versatile in the fact that it can be adapted for the users of traditional, in-ground solar pathway lights or used to illuminate potted flowers on the ground, as well as having an adapter to fit on most hanging planters in the market today.

In a preferred embodiment, the illuminating apparatus of the present invention, comprises a circular, disc-shaped housing with a central opening to be fitted to the support structure of the hanging planters and having solar cells for collecting electrical energy during daylight hours to recharge internal batteries which are controlled to power LED lights during night hours, to cast their light onto the plants/flowers in the hanging or potted planters.

Other features and advantages of the present invention will become apparent from the following description of the invention which refers to the accompanying drawings.

BRIEF DESCRIPTION OF THE DRAWINGS

FIG. 2b is a bottom view of FIG. 2a.

FIG. 2c is a top view of FIG. 2a.

FIG. 4a shows an alternative mounting structure for the illumination apparatus of FIG. 2a.

DETAILED DESCRIPTION OF EMBODIMENTS OF THE INVENTION

Figure 1:
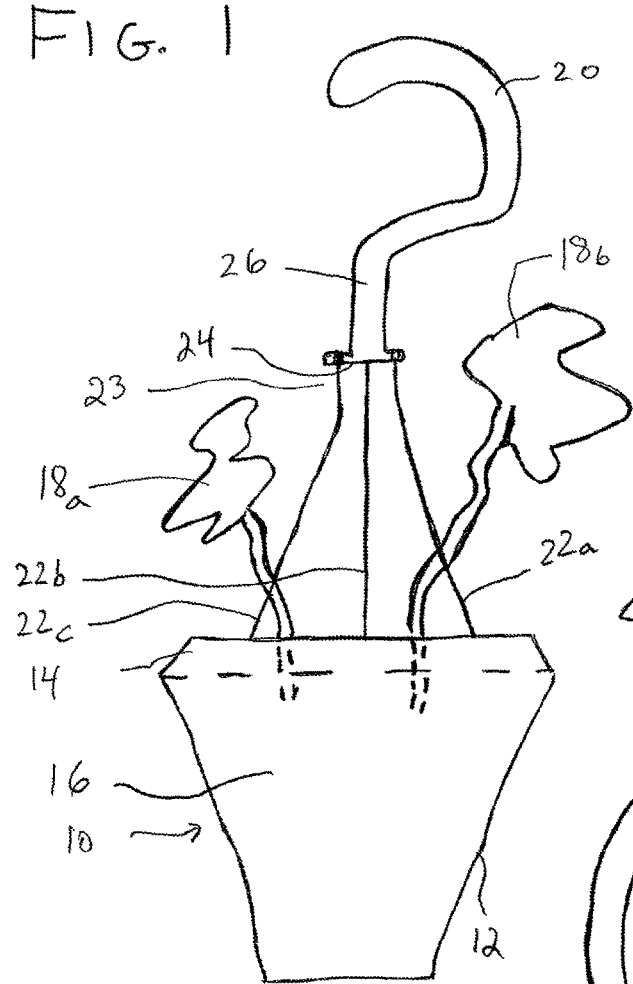
FIG. 1 shows a conventional hanging planter which accommodates potted plants and has a conventional hanging structure.

With reference to the drawings, FIG. 1 illustrates a conventional hanging flower planter 10 with a frustoconical-shaped body 12, a rim 14 defining an opening to an interior space that is filled with soil 16 in which are planted flowers 18a, 18b or the like. The planter 10 has hanging wires 22a, 22b, 22c that are preferably arranged 120° apart and which come together at the joint location 23 where they are affixed to the bottom 24 of a hanging hook 20 which has a bottom, and a stem 26.

Figure 2A:
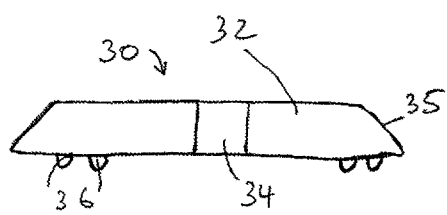
FIG. 2a shows a side view of the illumination apparatus of the present invention.
Figure 2B:
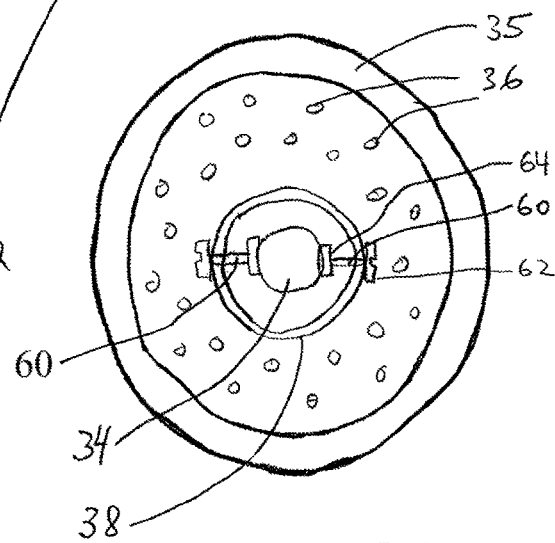
Figure 2C:
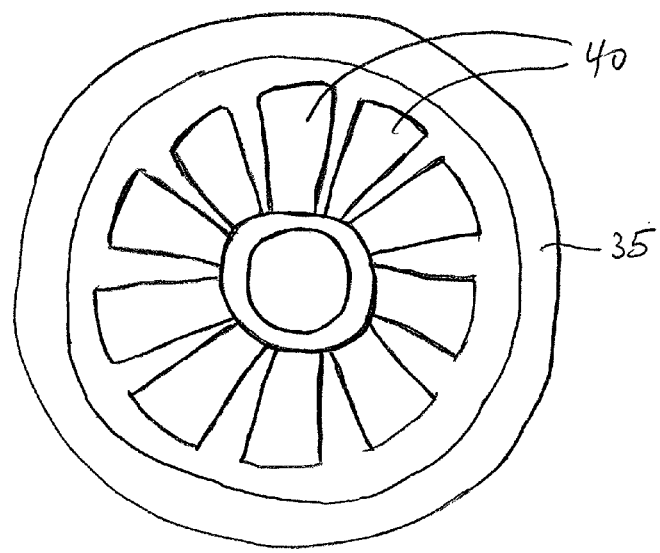

Referring to FIGS. 2a, 2b and 2c, the lighting apparatus 30 has a generally disc-shaped body 32 with a central opening 34, a sloping skirt 35, and an array of downwardly directed LEDs 36.

As seen in FIG. 2b, the LEDs 36 of the lighting apparatus 30 may be distributed on a bottom surface around the opening 34. The opening 34 may be surrounded by a circular wall 38 which threadedly supports a pair of tightening bolts 60, each with a screw head 62 and a holding block 64. A complementary structure is provided on the other bolt. The lighting fixture 30 may be attached to the conventional hanging planter 10, generally at location of the stem 26 of the hook 20, but its height can be adjusted up or down and in other ways, as described further on herein.

Figure 3:
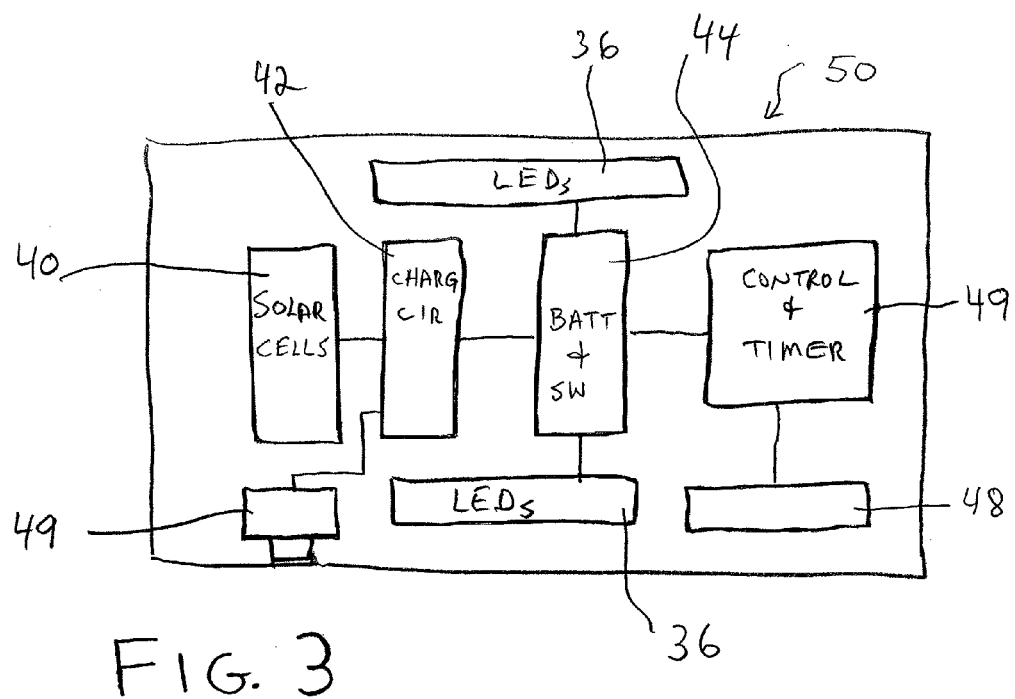
FIG. 3 is an electrical block diagram for the internal circuitry and the various electrical components of the present invention.

As shown by the top view of FIG. 2c, the lighting apparatus 30 has an upwardly facing array of solar cells 40 which can be arranged concentrically around the central opening 34 or in radial strips extending from the center to the periphery or in any manner whatsoever. Solar cells 40 generate electrical power that is applied to a charging circuit 42, as shown in FIG. 3. During daylight hours, the charging circuit 42 provides electrical charging current to batteries 44 housed within the body 32 of the lighting apparatus 30. The top surface on which the solar plates are arrayed can itself be sloped somewhat to improve the gathering of sun-generated energy to accumulate a sufficient charge in the batteries. The control 46 has an internal timer and/or may be responsive to a day/night sensor 48 which provides a control signal to the batteries which are themselves connected via a switch to the LEDs 36 to cause the LEDs 36 to illuminate the planter 10 during nighttime hours.

An optional A/C interface 49 may be provided to allow the fixture 30 to be connected an A/C power source to provide A/C power for the charging circuit to charge up the battery during days where sunlight is not available, so that the user may enjoy having the hanging planter illuminated even on nights which follow days that are not sunlit.

Figure 4A:
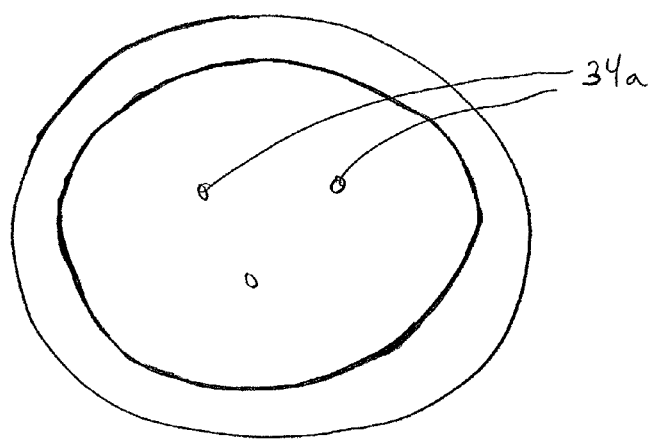
Figure 4B:
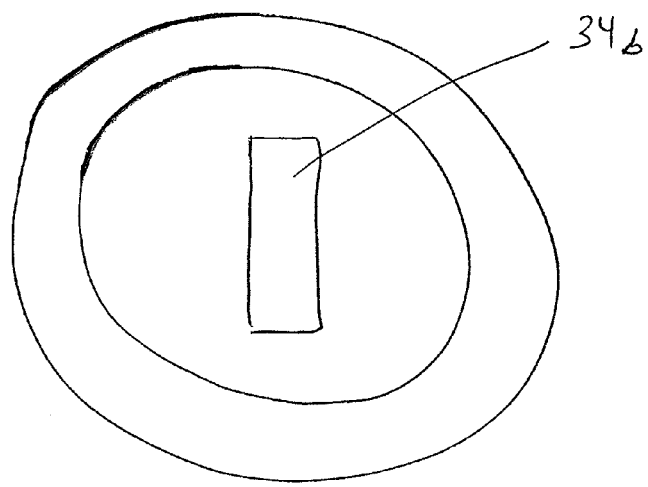
FIG. 4b shows yet another mode of mounting the illumination apparatus.
Figure 4C:
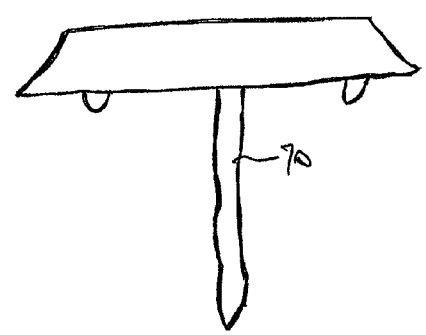
FIG. 4c shows yet another mode of mounting the illumination apparatus.

As shown in FIGS. 4a and 4b, different types of openings can be provided in the lighting fixture 30 so that it can accommodate different planters in different ways. Thus, in FIG. 4a, three thin openings 34a are provided for the passage of the wires 22a, 22b and 22c therethrough. In FIG. 4b, a rectangular opening is provided. In FIG. 4c, the lighting apparatus 30 is itself provided with a pointed, earth penetrating spoke 70 whereby, the lighting feature can be used along a pathway to a home, rather than directly in connection with a hanging planter.

Thus, as described above, the present invention differs from what currently exists. Present light assemblies to illuminate outer hanging planters or flower baskets or potted flowers require the purchase of an entire costly assembly and previously owned hanging planters could not be used with them. With the lighting apparatus 30 of the present invention, the same can be easily mounted on or adapted for use with existing hanging planters or potted plants, as well as used as traditional pathway lighting fixtures (by using the FIG. 4c mount).

The present invention is, accordingly, more versatile, as well as more economical to produce and maintain and, therefore, more adaptable for its intended use than existing devices. It also promotes the wider use of illumination for plants all night long, which enhances plant growth, as well as causes insects to be drawn to the flowers at night and fall within the planter, providing needed nutrients to the soil.

Although the lighting assembly 30 has been described and depicted as being round, any other shape is also available; for example, square or more rectangular or any other shape.

In accordance with a further embodiment, other affixing structures can be used to attach the lighting fixture to the hanging planter. For example, the wires may be connected to the bottom of the penetrating rod 70 and the top of the fixture may accommodate the hook 20 so that the light source is situated higher above the planter than as shown in the drawings.

In accordance with other embodiments, the lighting fixture may accommodate light filters that can provide different colors to change the mood or the setting, as well as being provided with an adapter to fit existing planters in manners which are different than as described above. For example, the lighting fixture may be provided with an arm that has a clip at a distal end thereof which can be clipped to or otherwise attached anywhere to a planter or to a potted flower or the like.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A solar cell powered lighting fixture combined with a planter, the lighting fixture comprising:
   a body with an upper side, a bottom side and a centered, single opening at a center of the body for accommodating hanging hardware of a planter;
   solar cells on the upper side for generating electrical power from ambient light;
   at least one rechargeable battery and a charging circuit for charging the battery;
   a plurality of LED lights provided at the bottom side and connected to the battery via a switching circuit;
   a control circuit for operatively connecting LED lights to the at least a battery during nighttime hours to illuminate the planter having growing plants planted therein; and
   a securing mechanism configured to enable the lighting fixture to receive hanging hardware of the planter through its opening and to be secured to the planter, wherein the planter includes wires as its hanging hardware and the lighting fixture centered opening enables accommodating the planter wires to pass through said centered, single opening, further including at least one tightening bolt that allows the lighting fixture to be tightened and be held to the planter's hanging hardware.

2. The lighting fixture of claim 1, wherein the body is circular.

3. The lighting fixture of claim 1, wherein the opening is circular.

4. The lighting fixture of claim 1, wherein the opening is rectangular.

5. The lighting fixture of claim 1, wherein the planter comprises a hanging stem and the lighting fixture is mounted at the stem.

6. The lighting fixture of claim 1,
   wherein the height of the lighting fixture relative to a body of the planter is height-wise adjustable.

7. The lighting fixture of claim 6, including a securing mechanism configured to secure the lighting fixture to the hanging hardware at a height-wise adjustable position on the hanging hardware.

8. The lighting fixture of claim 1, wherein the opening is surrounded by a wall.

9. The lighting fixture of claim 1, including a filter mounted adjacent to the lights to control the coloring of the lights.

10. The lighting fixture of claim 1, wherein the LED lights produce white light.

* * * * *